Oct. 19, 1926.

C. L. MICHOD 1,603,854

AUTOMOBILE TRANSPORTATION SUPPORT

Filed Nov. 13, 1922    2 Sheets-Sheet 1

C. L. Michod,
Inventor

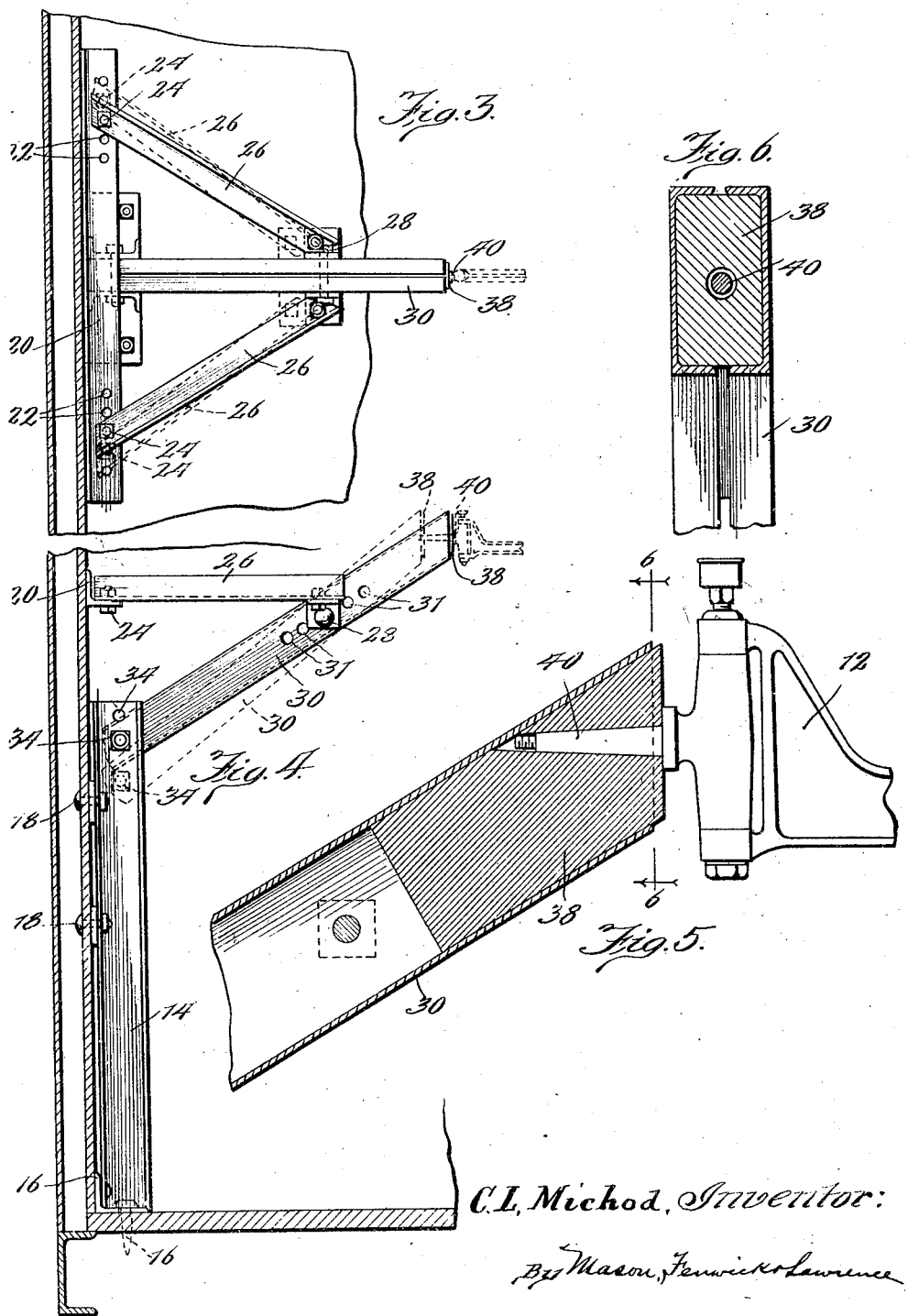

Patented Oct. 19, 1926.

1,603,854

UNITED STATES PATENT OFFICE.

CHARLES L. MICHOD, OF CHICAGO, ILLINOIS, ASSIGNOR, BY MESNE ASSIGNMENTS, OF ONE-HALF TO THE STUDEBAKER CORPORATION, OF SOUTH BEND, INDIANA, A CORPORATION OF NEW JERSEY, AND ONE-HALF TO THE COPONY AUTO LOADING COMPANY, OF DETROIT, MICHIGAN, A CORPORATION OF MICHIGAN.

AUTOMOBILE TRANSPORTATION SUPPORT.

Application filed November 13, 1922. Serial No. 600,757.

This invention relates to improvements in devices for supporting automobiles in transit, and has for its principal object the provision of an adjustable means for supporting or suspending an automobile in position in the upper part of a freight car so as to permit of an arrangement whereby one automobile may be supported in such car above another automobile so as to permit of the shipping of double the number of machines than would ordinarily be possible if the original floor space of a car alone were utilized.

One of the important objects of this invention is the provision of an automobile transportation support whereby automobiles may be shipped in freight cars, in elevated position over other automobiles, so as to economize in the use of space within the cars, and whereby such support will be made adjustable to permit of the accommodation of different automobiles as might be necessary, particularly in shipments of passenger automobiles and trucks of various models. Also sometimes automobiles are shipped suspended on the hubs of the wheels, and at other times the wheels are removed, and the machine is suspended or supported by the axles. The support of this invention is designed to be adjusted to accommodate either method of shipment.

Another and further important object of this invention is the provision of an automobile transportation support which shall be readily and economically constructed, and which, moreover, shall be strong and durable, so that it may be used over and over again in the shipment of such automobiles, and which may be conveniently taken down, packed up, and reshipped to the original point of shipment on a very low freight rate.

Still another important object of this invention is the provision of a transportation support for automobiles, whereby said automobiles are firmly secured in position in a freight car for shipping purposes, and which support shall be so adjustable so that the desired height of the automobile over another automobile in the car may be readily attained, and is further adjustable so that if the width of the automobiles vary from time to time as passenger cars or trucks of different makes are being shipped, the supporting device can be so adjusted that compensation may be made for increased or decreased width without disturbing the relative weight of the supported machine, and vice versa.

Other and further important objects of the invention will be apparent from the disclosures in the accompanying drawings and following specification.

The invention, in a preferred form, is illustrated in the drawings, and hereinafter more fully described.

In the drawings:

Fig. 3 is an enlarged top plan view of the improved device of this invention.

Fig. 4 is a side elevation thereof.

Fig. 5 is a detail view showing the upper end of the device, and its connection with the axle of the automobile to be supported.

Fig. 6 is a sectional view taken on the line 6—6 of Fig. 5, looking in the direction indicated by the arrows.

As shown in the drawings:

Figure 1:
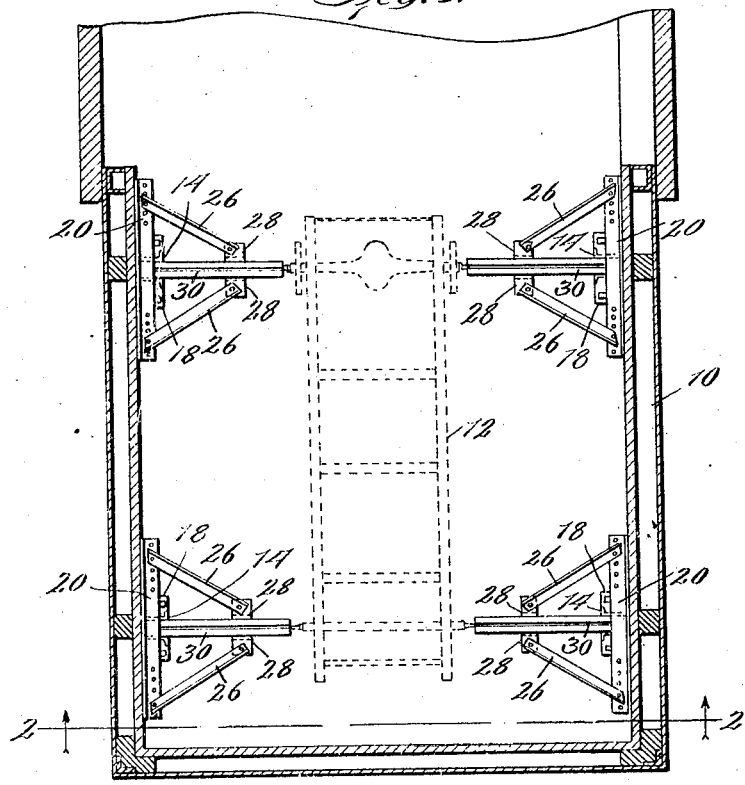
Fig. 1 is a top plan view of the interior of a freight car showing a set of the improved devices of this invention in position, and as applied to an automobile in transit.
Figure 2:
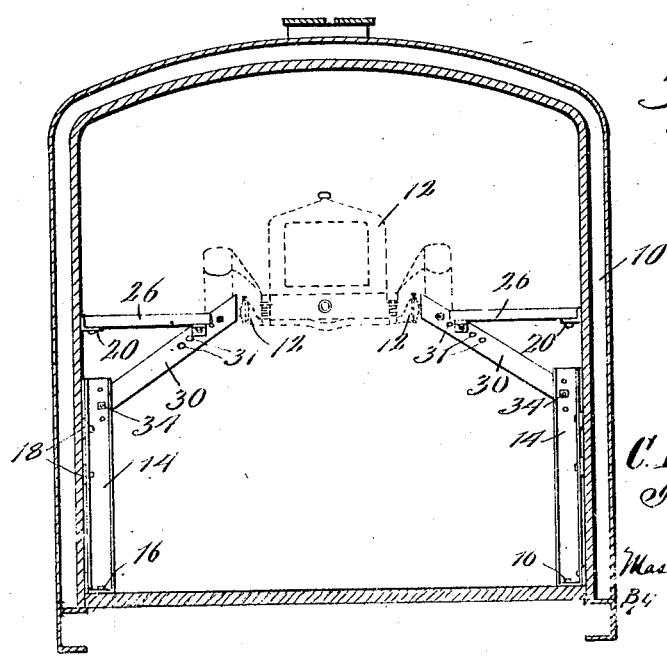
Fig. 2 is a sectional view taken approximately on the line 2—2 of Fig. 1, looking in the direction indicated by the arrows.

The reference numeral 10 indicates generally a box car or other convenient freight car used for shipping automobiles, and, in the drawings an illustration of an automobile 12 is shown as positioned on a set of four of the adjustable supports of this invention which are applied to the sides of the car 10.

As illustrated, the support of this invention comprises mainly a single upstanding vertical element 14 formed of channel or angle iron, or of any other conveniently shaped metal or other material, and is attached to the bottom and sides of the car by bolts 16 and 18 respectively. The upstanding element 14 extends upwardly along the side of the car to a height not quite up to the level at which the axle or lower part of the automobile supported will be positioned. However, positioned at some slight distance above the end of the vertical element 14, and at approximately the level of the axle of the automobile to be supported, is a horizontally extending coacting element 20, which may be likewise composed of either an angle bar, a T-bar, an I-beam or the like, and which is securely fastened to the side of the car by any convenient means. The horizontally extending member 20 comprises a ledge portion integral therewith and extending outwardly from the sides of the car, which projecting ledge portion is provided at each end thereof with a series of holes 22 into which pins or bolts or the like are adapted to be fitted, and which bolts extend through two openings in similar horizontally extending brace members 26, which, however, are positioned at angles of about 45° to the horizontal ledge 20, and have their ends converging towards each other. These angularly extending members 26 are connected at their outer adjacent ends by means of a short transversely extending rod or bar 28, which is pivotally and adjustably positioned upon the ends of these members 26. As shown by the dotted lines in Figs. 3 and 4, the distance between the rod 28 and the walls of the car 10 may be adjusted by changing the angles between the members 26 and the horizontal element 20, which is done by locating the bolts 24 and the ends of the braces 26 in different holes 22 in the bar 20.

Coacting with the top of the vertical member 14, and extending outwardly and angularly upward therefrom is a support or beam 30 having pivotally mounted at approximately its middle portion in one of a number of openings 31 therein, the transversely extending bar 28. The lower end of the support or beam 30 is secured by a bolt inserted in one of a series of holes 34, drilled into the upper end of the member 14, whereby the height of the brace 30 with respect to the vertically extending member 14, and also its angle of extension with relation thereto, may be changed at will. If desired, instead of the holes 31, a longitudinally extending slot may be formed in the member 30 having notches in the upper side thereof, whereby the relation of the member 30 with respect to the transversely extending bolt or bar 28 may be more readily changed, and the upper end of the member 30 thereby kept at approximately the same level regardless of the angle between the member 30 and the upright 14. The support or brace 30 is composed of metal in either channel or tubular form, and has its upper end fitted with a block of wood, hard rubber or similar material 38, having an opening therein provided for the reception of the axle 40 of the automobile 12. As shown by the dotted lines in Figs. 3 and 5 the position of the upper outstanding end of the member 30, together with the block 38 placed therein, can be readily and accurately adjusted with respect to the sides and bottom of the freight car 10, so as to provide for the reception of an automobile of any desired width, and at any particular height above the floor of the car.

Moreover, by means of this device a support is provided for said automobile whereby it will be absolutely free from liability to jar loose and drop down upon the floor of the car, or upon an automobile immediately thereunder, and will also be supported against any damage which might result from its being suddenly thrown against the end of the car due to jerks or sudden stops in transit, as this improved method of support maintains the automobile in predetermined position at all times regardless of ordinarily experienced forces tending to shift the same. Further, the device may be readily taken down after the shipment of the automobile is completed, and the entire apparatus put together within a small compass and reshipped to the original place of manufacture of the automobiles or shipping points, there to be used over and over again regardless of any particular size or height of automobiles, and also regardless of the width and height of the freight cars in which the automobiles are shipped, which might also sometimes vary.

I am aware that many changes may be made and numerous details of construction varied through a wide range without departing from the principles of this invention, and I therefore, do not purpose limiting the patent granted hereon otherwise than as necessitated by the prior art.

I claim as my invention:

1. An automobile support for use in shipping, including a vertical member, an outwardly extending arm pivotally mounted thereon, a support mounted transversely of said vertical member, and a plurality of brace members extending from said horizontal support adapted to support the end of said arm.

2. An automobile support for use in shipping, including a vertical member, an outwardly extending arm pivotally mounted thereon, a support mounted transversely of said vertical member, and means extending from said support adapted to support the end of said arm, said supporting means being longitudinally adjustable with respect to the transverse support.

3. An automobile support for use in shipping, including a vertical member, an outwardly extending arm pivotally mounted thereon, a support mounted transversely of said vertical member, means extending from said support adapted to support the end of said arm, said supporting means being angularly adjustable on the transverse support, an adjustable pivotal connection between the arm and the end of said angular supporting means and means for adjusting the supporting means with respect to the transverse support.

4. An automobile support for use in shipping, including a vertical member, an outwardly extending arm pivotally mounted thereon, a bar mounted transversely of said vertical member, means extending from said bar adapted to support said arm, said supporting means being angularly adjustable at one end on the transverse bar, and a pivotal and slidable connection between the arm and the other end of said angular supporting means.

5. An automobile support for use in shipping, including a vertical member, an outwardly extending arm pivotally mounted thereon, a bar mounted transversely of said vertical member, means extending from said bar adapted to support said arm, said supporting means being angularly adjustable on the transverse bar, and a recessed block on said arm adapted to receive the axle of the automobile.

6. An automobile transportation support including a vertical upright, an outwardly extending arm pivotally and adjustably mounted at its upper end, a beam mounted transversely of said upright, angularly extending arms on said beam, means for adjusting the relation of said arms to the beam, and pivotal connecting means between the outer ends of said arms and said first mentioned arm.

7. In combination with a freight car, a vehicle therein, and a plurality of supporting structures, for the vehicle, each of said structures comprising a vertical member fixed to the side of said car, an arm extending from said vertical member, a bar mounted on the side of the car transversely of said vertical member, and adjustable connecting means between said bar and the arm.

8. In combination with a freight car, a vehicle therein, and a plurality of supporting structures for the vehicle, each of said structures comprising a vertical member fixed to the side of said car, an arm extending outwardly and upwardly from said vertical member, a horizontal element mounted on the side of the car above the end of said vertical member, and adjustable connecting means between said element and the arm, said adjustable connecting means comprising horizontally extending beams removably and adjustably mounted on the horizontal element.

9. In combination with a freight car, a vehicle therein, and a plurality of supporting structures for the vehicle, each of said structures comprising a vertical member fixed to the side of said car, a pivoted arm extending from the top of said vertical member, a horizontal support mounted on the side of the car above the end of said vertical member, adjustable connecting means between said support and the arm, said adjustable connecting means comprising converging horizontally extending beams removably and adjustably mounted on the support, and a combined sliding and pivoted connection between the adjacent outer ends of the beams and the pivoted arm.

10. An automobile transportation support for freight cars including an arm pivotally mounted on the inner side of a freight car, a bar mounted on the side of the car said bar mount being spaced from the pivotal point of said arm both with respect to the vertical and horizontal, and adjustable connecting means between said bar and the arm.

11. An automobile transportation support for freight cars including an arm pivotally mounted to the inner side of the freight car, a bar fixed to the side of the car above the pivotal point of said arm, and adjustable connecting means between said bar and the arm, said means comprising a plurality of angularly extending members each having one end adjustably mounted on the horizontal bar, and the other end pivotally and adjustably connected to the pivoted arm.

In testimony whereof I affix my signature.

CHARLES L. MICHOD.